United States Patent Office 3,773,903
Patented Nov. 20, 1973

3,773,903
METHOD OF MANUFACTURING DIAMOND CRYSTALS
Tatsuo Kuratomi, 2–18, 4-chome, Hamatake, Chigasaki-shi, Kanagawa-ken, Japan
No Drawing. Filed Mar. 1, 1972, Ser. No. 231,011
Claims priority, application Japan, Mar. 25, 1971, 46/16,899
Int. Cl. C01b *31/06*
U.S. Cl. 423—446    11 Claims

ABSTRACT OF THE DISCLOSURE

Diamond crystals are produced by subjecting to elevated temperatures and pressures a mixture of a nondiamond form of carbon, together with barium carbide, which serves as the solvent for conversion to the diamond form. In preferred embodiments, a metal boride catalyst is utilized, or powdery diamond seed crystals are used to encourage the growth of diamond crystals.

BACKGROUND OF THE INVENTION

This invention relates to a process of producing diamond crystals synthetically. More particularly, this invention relates to a process of producing diamond crystals synthetically by subjecting nondiamond carbon to elevated temperatures and pressures, together with a suitable solvent.

The synthetic production of diamond crystals has long been of great interest because of the scarcity of natural diamond and many industrial uses for diamond. In prior art solvent processes, transition metals such as cobalt, nickel, iron, manganese and chromium which form somewhat unstable carbides have been employed as solvents and catalysts for carbon to be transformed into the diamond form. In all of these solvent processes, two reaction conditions must be satisfied. First, the nondiamond carbon or carbonaceous material must be subjected to pressure and temperature such that diamond is a thermodynamically stable form of carbon. This region is defined for temperatures above about 1200° K. (927° C.) by the Berman-Simon line (R. Berman and F. E. Simon, Z. Electrochem., 59, 333–38 (1955)), which states that the minimum pressure necessary for diamond to be thermodynamically stable is defined by $P=7000+27T$, where $P$ is the pressure in atmosphere and $T$ is the temperature in degrees Kelvin.

The second condition to be satisfied is that there must be included sufficient solvent to accomplish conversion, and the temperature and pressure must be sufficient for the solvent to melt.

Although a wide variety of materials have been suggested for use in diamond synthesis as solvents, for example those materials disclosed by H. M. Strong in U.S. Pat. 2,947,609, or by me in my U.S. Pats. 3,576,602 and 3,607,060, as well as my U.S. patent application 848,344, filed Aug. 7, 1969, the use of barium carbide as a catalyst has not been suggested.

SUMMARY OF THE INVENTION

It has been found, according to the present invention, that when barium carbide is used as a solvent for carbon in the manufacture of diamond crystals, the reaction is stable and a high rate of production is possible. Accordingly, the present invention provides a process for producing diamond crystals, comprising the steps of subjecting to elevated temperatures in excess of 2000° C., and pressures in excess of 68,400 atmospheres, a mixture of non-diamond carbonaceous material and barium carbide; cooling the resultant product; and separating the diamond crystals therefrom.

It has further been found that when the above reaction is carried out with fused barium carbide as a solvent for carbon in diamond synthesis, and in addition a metal boride catalyst is utilized, then comparatively uniform diamond crystals are manufactured, with relatively few finer diamond crystals. Accordingly, in a preferred embodiment of the present invention, there is provided a process for producing diamond crystals, comprising the steps of subjecting to elevated temperatures above 2000° C. and pressures above 68,400 atmospheres, a mixture of nondiamond carbon, barium carbide, and a metal boride catalyst of the group consisting of titanium diboride ($TiB_2$), zirconium diboride ($ZrB_2$), hafnium diboride ($HfB_2$), niobium monoboride (NbB), triniobium tetraboride ($Nb_3B_4$), niobium diboride ($NbB_2$), tantalum monoboride (TaB), tritantalum tetraboride ($Ta_3B_4$) and tungsten monoboride (WB); cooling the resultant product; and separating the diamond crystals therefrom.

It has been further found, when manufacturing diamond crystals using a barium carbide solvent, that when powdery diamond crystals are used as seed crystals coexistant in the fused barium carbide, relatively few fine diamond crystals are manufactured and comparatively uniform diamond crystals are produced, as the result of conversion of carbon and the growth of uniform diamond particles on the seed crystals. Accordingly, in a further preferred embodiment of the present invention there is provided a process for the production of diamond crystals, comprising the steps of subjecting to elevated temperatures in excess of 2000° C. and pressures in excess of 68,400 atmospheres, a mixture of nondiamond carbon, barium carbide and powdery diamond seed crystals; cooling the resultant product; and separating the diamond crystals therefrom.

DETAILED DESCRIPTION

As used herein, "nondiamond carbon" or "nondiamond carbonaceous material" includes not only free carbon such as graphite, charcoal, coke, coal and amorphous carbon, but also chemically bound carbon, i.e., inorganic and organic compounds which decompose to yield free carbon when subjected to the reaction conditions. It is highly preferred that the nondiamond carbon employed in the process of this invention be free carbon, and graphite is especially preferred. The preferred ratio of barium carbide to nondiamond carbonaceous material varies from about 2:1 to about 1:2 by weight, although ratios outside this range may be used if desired, and a ratio of about 1:1 is particularly preferred. Likewise, while the ratio of graphite to metal boride or powdery diamond seed crystals can vary between from about 1:1 to about 5:1 by weight, a ratio outside this range can be used if desired, and a ratio of about 2.5:1 is preferred. While the elevated temperature for the reaction of the present invention should be above 2000° C., which requires according to the Berman-Simon line described above a minimum pressure of over 68,400 atmospheres, a temperature over 2400° C. is preferred, which requires a pressure in excess of 79,200 atmospheres for diamond synthesis.

Any suitable apparatus which is capable of these temperatures and pressures can be used for diamond synthesis according to the present invention, for example the types disclosed in U.S. Pats. 2,941,248 and 2,941,252, granted June 21, 1960 to H. T. Hall and H. D. Bovenkirk, respectively; or of my U.S. Pat. 3,492,695, granted Feb. 3, 1970. It is relatively easy to produce such apparatus, and also to enlarge the capacity of the reaction chambers of such apparatus. Accordingly, the process of this invention can be used in industrial mass production of diamond crystals, which are highly useful as abrasives.

When barium carbide is utilized with a nondiamond carbonaceous material to form diamonds, according to the present invention, the materials are subjected to a temperature, as described above, such that the barium carbide is in the fused state. When in addition to the barium carbide and carbonaceous material, a metal boride catalyst is utilized, the temperature should be maintained sufficiently low that the metal boride catalyst remains in the solid state. In such a condition, the metal boride catalyst is able to facilitate the crystallization of carbon dissolved in the barium carbide in the fused state into diamond. Temperatures at which metal borides melt include the following: $TiB_2$, 2980° C.; $ZrB_2$, 3040° C.; $HfB_2$, 3250° C.; $NbB_3B_4$, 2700° C.; $NbB_2$, 2900° C.; $Ta_3B_4$, 2650° C.; and WB, 2920° C. In the case of any of the nine preferred metal boride catalysts, the solid catalyst exists in the reaction chamber along with the fused barium carbide and the carbon, so that the carbon, dissolved in the fused barium carbide at a comparatively lower degree of supersaturation, can be crystallized into diamond by contacting the crystal face of the catalyst. In other words, when a solid metal boride catalyst coexists in the reaction material, the diamond crystallization can be made easier and more quickly than when it does not. The optimum metal boride catalyst is selected from the group consisting of titanium diboride, zirconium diboride, hafnium diboride, niobium monoboride, triniobium tetraboride, niobium diboride, tantalum monoboride, tritantalum tetraboride and tungsten monoboride, and preferably operated under conditions such that the metal boride catalyst is not melted, but remains in the solid state under the pressure-temperature conditions for the reaction.

When powdery diamond seed crystals are utilized along with barium carbide and the nondiamond carbonaceous material as the reaction material, and subjected to the pressure-temperature conditions required for the reaction, barium carbide is in the fused state and the carbon is dissolved in the fused barium carbide. The conditions under which a supersaturated solution of carbon in the fused barium carbide is presented satisfies the pressure-temperature conditions in the diamond stable region, and therefore carbon dissolved in the supersaturated solution is crystallized into diamonds. In the case in which powdery diamond crystals are utilized as seed crystals, the carbon dissolved in the fused barium carbide is at a comparatively lower degree of supersaturation, and can be crystallized into diamond and make an epitaxial growth on the crystal face of the diamond seed crystals by contacting the crystal surface. In other words, when powdery diamond seed crystals are utilized, the reaction of diamond crystallization is made easier and more quickly than when the powdery diamond seed crystals are not utilized.

The invention is further illustrated by the following examples, in which a high pressure-high temperature apparatus, capable of 2600° C. temperature and 100,000 atmospheres pressure, was used.

EXAMPLE 1

A mixture of 1000 milligrams of barium carbide powder as a solvent for carbon, and 1000 milligrams of high purity graphite powder as a nondiamond carbonaceous material, was used as the reaction material for this example. These materials were mixed and placed in the reaction chamber of the high pressure-high temperature apparatus, and subjected to a pressure of 87,000 atmospheres and simultaneously to a temperature of 2400° C., for 20 minutes.

After the reaction was completed as described, the pressure was released, the reaction material was water cooled until the temperature fell to about 200° C., and the materials were taken from the reaction chamber, treated with acid, and centrifuged.

Diamond crystals were collected, and the conversion rate of graphite into diamond was found to be 57%.

EXAMPLE 2

A mixture of 1000 milligrams of barium carbide powder as a solvent for carbon, 1000 milligrams of high purity graphite as a carbonaceous material, and 400 milligrams of zirconium diboride ($ZrB_2$) as a catalyst was used as the reaction material for this example. These materials were mixed together and placed in the reaction chamber of the apparatus, and subjected to a pressure of 87,000 atmospheres and simultaneously to a temperature of 2400° C., for 20 minutes.

After the reaction was completed as described, the pressure was released, the reaction material was water cooled until the temperature fell to about 200° C., and the materials were taken from the reaction chamber, treated with acid and centrifuged.

Diamond crystals were collected, and the conversion rate of graphite into diamond was found to be 66%. In the collected diamond crystals, the size range of crystals produced was found to be comparatively narrow, and relatively few finer crystals were found.

EXAMPLE 3

A mixture of 1000 milligrams of barium carbide powder as a solvent for carbon, 1000 milligrams of high purity graphite powder as a nondiamond carbonaceous material, and 400 milligrams of powdery diamond crystals of 320 mesh size (about 44 microns diameter) as seed crystals was used as the reaction material for this example. These materials were mixed and placed in the reaction chamber and subjected to a pressure of 87,000 atmospheres and simultaneously to a temperature of 2400° C. for 20 minutes.

After the reaction was completed as described, the pressure was released, the reaction material was water cooled until the temperature fell to about 200° C., and the materials were taken from the reaction chamber, subjected to an acid treatment and centrifuged.

Diamond crystals were collected, and the conversion rate of graphite into diamond was found to be 67%. In the collected diamond crystals, a comparatively narrow size range of diamonds was found and relatively few finer crystals were found.

From the above, it can be seen that the present invention has the following effects.

(1) When the reaction is carried out using barium carbide as a solvent for carbon to manufacture diamond crystals, a stable reaction and a high production rate of carbon into diamond is possible.

(2) When the reaction for manufacturing diamond crystals is carried out using barium carbide as a solvent for carbon, and also a metal boride catalyst which remains in the solid state in the fused barium carbide, relatively few finer diamond crystals are manufactured, and comparatively uniform diamond crystals are formed.

(3) When the reaction for manufacturing diamond crystals is carried out using barium carbide as a solvent for the carbon, and also using uniform and powdery diamond seed crystals coexistent in the fused barium carbide, relatively few finer diamond crystals are manufactured, and comparatively uniform diamond crystals are formed, as the result of conversion of carbon to diamond and the growth of uniform diamond particles as the seed crystals are enlarged in size.

I claim:

1. A process for producing diamond crystals, comprising the steps of:
    (1) subjecting to elevated temperatures in excess of 2000° C. and pressure in excess of 68,400 atmospheres, a mixture of nondiamond carbonaceous material and barium carbide;

(2) cooling the resultant product; and
(3) separating the diamond crystals therefrom.

2. A process according to claim 1, wherein the temperature is at least about 2400° C. and the pressure is at least about 79,200 atmospheres.

3. A process according to claim 2, wherein the ratio of barium carbide to nondiamond carbon ranges from about 2:1 to about 1:2 by weight.

4. A process according to claim 1, wherein the mixture subjected to elevated temperature and pressure comprises in addition a metal boride catalyst, selected from the group consisting of titanium diboride, zirconium diboride, hafnium diboride, niobium monoboride, triniobium tetraboride, niobium diboride, tantalum monoboride, tritantalum tetraboride and tungsten monoboride.

5. A process according to claim 4, wherein the temperature is at least about 2400° C. and the pressure is at least about 79,200 atmospheres.

6. A process according to claim 5, wherein the ratio of barium carbide to nondiamond carbon ranges from about 2:1 to about 1:2 by weight.

7. A process according to claim 6, wherein the ratio of nondiamond carbon to metal boride catalyst ranges from about 1:1 to about 5:1 by weight.

8. A process according to claim 1, wherein the mixture subjected to elevated temperature and pressure comprises in addition powdery diamond seed crystals.

9. A process according to claim 8, wherein the temperature is at least about 2400° C. and the pressure is at least about 79,200 atmospheres.

10. A process according to claim 9, wherein the ratio of barium carbide to nondiamond carbon ranges from about 2:1 to about 1:2 by weight.

11. A process according to claim 10, wherein the ratio of nondiamond carbon to powdery diamond seed crystals ranges from about 1:1 to about 5:1 by weight.

References Cited

UNITED STATES PATENTS

| | | | |
|---|---|---|---|
| 3,457,043 | 7/1969 | Wakatsuki et al. | 423—446 |
| 3,334,968 | 8/1967 | Ishizuka | 423—446 |

FOREIGN PATENTS

| | | | |
|---|---|---|---|
| 698,804 | 1/1964 | Canada | 423—446 |
| 252,685 | 5/1963 | Australia | 423—446 |

EDWARD J. MEROS, Primary Examiner